United States Patent

Siller

[15] 3,661,394

[45] May 9, 1972

[54] TAPE RECORDER WITH POINTER DRIVE

[72] Inventor: Imre Siller, Nuernberg, Germany

[73] Assignee: Grundig E.M.V. Elektro-Mechanische Versuchsanstalt Inhaber Max Grundig, Furth Bayern, Germany

[22] Filed: Apr. 14, 1970

[21] Appl. No.: 28,426

[30] Foreign Application Priority Data

Apr. 15, 1969 Germany.........................G 69 14 932

[52] U.S. Cl...........................................................274/4 C

[51] Int. Cl.......................................................G11b 15/32

[58] Field of Search.............33/172 E; 352/78, 72; 274/4 D, 274/4 B, 4 C, 11 B, 11 C, 11 D

[56] References Cited

UNITED STATES PATENTS

| | | | |
|---|---|---|---|
| 3,394,898 | 7/1968 | Laa | 274/4 E |
| 3,439,919 | 4/1969 | Laa | 274/4 E |

FOREIGN PATENTS OR APPLICATIONS

| | | | |
|---|---|---|---|
| 360,725 | 11/1931 | Great Britain | 274/4 D |

*Primary Examiner*—Harry N. Haroian
*Attorney*—Michael S. Striker

[57] ABSTRACT

A tape cartridge is inserted into a pivotally mounted opened holding lid and assumes a preliminary position in which a coupling means in the cartridge is aligned with a coupling means on a drive shaft projecting from the tape recording housing. When the holding lid is closed, the coupling means engage each other and the drive shaft drives a pointer-operating transmission through the engaged coupling means.

10 Claims, 1 Drawing Figure

Inventor:
IMRE SIGGEL

By: Michael S. Striker
Attorney

TAPE RECORDER WITH POINTER DRIVE

BACKGROUND OF THE INVENTION

The present invention relates to a tape recorder which is operated by a cassette cartridge having two winding cores for a coiled tape, and a graduated scale cooperating with a pointer for indicating the portion of tape which is located opposite the recording head.

In tape recorders of this type, according to the prior art, the drive means of the tape recorder drive through a worm gear drive a threaded spindle on which a nut with the pointer is mounted so that during rotation of the tape cores, the pointer is displaced along the graduated scale.

Since the tape cartridge is inserted into and removed from the tape recorder, the apparatus of the prior art has a worm screw forming part of the tape recorder and being driven by the motor of the same, and worm gear which is mounted on the tape cartridge and connected for rotation with the pointer spindle. When the tape cartridge is inserted, the worm gear engages the worm screw, so that the pointer is driven from the motor of the tape recorder in synchronism with the winding of the tape.

If the cartridge is used in a tape recorder which has a pivoted holding lid for the cartridge, it is necessary to move the lid parallel to the top wall of the tape recorder, and to then turn the holding lid to an open position in which the cartridge can be inserted and removed. The mechanism required for this operation is complicated and expensive.

SUMMARY OF THE INVENTION

It is one object of the invention to provide a tape recorder into which a cartridge with a pointer drive can be easily inserted to a position in which the pointer drive is driven from the drive means of a tape recorder.

Another object of the invention is to provide a tape recorder with a pivoted holding lid into which the cartridge can be inserted, and then moved with the holding lid to a position in which the pointer-operating transmission is driven.

Another object of the invention is to provide simple and inexpensive coupling means for coupling the pointer drive of a cartridge with the drive means of a tape recorder.

With these objects in view, the invention provides a first coupling means on a worm gear of the pointer-operating transmission which engages another coupling means on a drive shaft of the tape recorder when the cartridge is in the operative position. In accordance with the invention, the two coupling means are aligned in axial direction are non-circular, and do not include separable gears.

One embodiment of the invention comprises tape recorder means including housing means and a drive shaft mounted in the housing means and having first coupling means rotatable about a first axis and projecting from the housing means; and a tape cartridge including a casing, and a pointer-operating transmission mounted in the casing and including a second coupling means rotatable about a second axis. In accordance with the invention, the tape cartridge has a preliminary position in which the first and second axes substantially register, and the second coupling means is substantially aligned with and spaced from the first coupling means in axial direction.

The cartridge can be moved to and from the preliminary position in a direction transverse to the first and second axes, and is movable in the preliminary position in axial direction to and from an operative position in which the first and second coupling means engage each other and the drive shaft of the tape recorder drives the pointer-operating transmission through the first and second coupling means.

In the preferred embodiment of the invention, the cartridge is inserted into a holding lid to assume the preliminary position, and the holding lid is turnable about an axis which is parallel to the adjacent narrow side wall of the cartridge so that the first coupling means engages the second coupling means when the holding lid is tilted from an open inserting position to a closed position.

The holding lid has a cavity into which the portion of the tape cartridge fits so that the same can be inserted into the cavity in the open position of the lid, and is held in the same in the preliminary position in which the two coupling means are substantially aligned but still spaced. The pointer-operating transmission is also located in this portion of the cartridge, so that the two coupling means are spaced only a small distance in axial direction when the holding lid is open and supports the cartridge in the preliminary position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
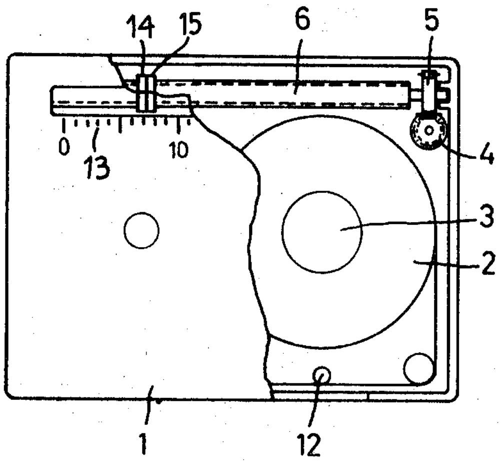
FIG. 1 is a schematic plan view of a tape cartridge according to the invention, one casing wall being broken off partly.

A tape cartridge 1 has two cores 3 about which a tape 2 is wound, and a graduated scale 13 cooperating with a pointer 14 having a nut portion 15 mounted in a threaded spindle 6 which is mounted on the cartridge for rotation, and carries at its end a worm gear 5 meshing with the worm screw 4 mounted in the top and bottom walls of cartridge 1 for rotation about an axis. The lower end of the worm screw 4 is a cylindrical portion serving as journal for worm screw 4, and having a non-circular axially extending coupling portion with a transverse recess or open slot into which a diametrical non-circular axially extending coupling projection 8 on the end face of a drive shaft 7 projects when cartridge 1 is in the operative position shown in FIG. 2. Drive shaft 7 is mounted in the housing 20 of the tape recorder, and is driven by its motor. A tape transporting shaft 12 is also mounted in the tape recorder housing, and projects through an opening in the cartridge into the interior of the same for driving the tape 2.

Figure 2:
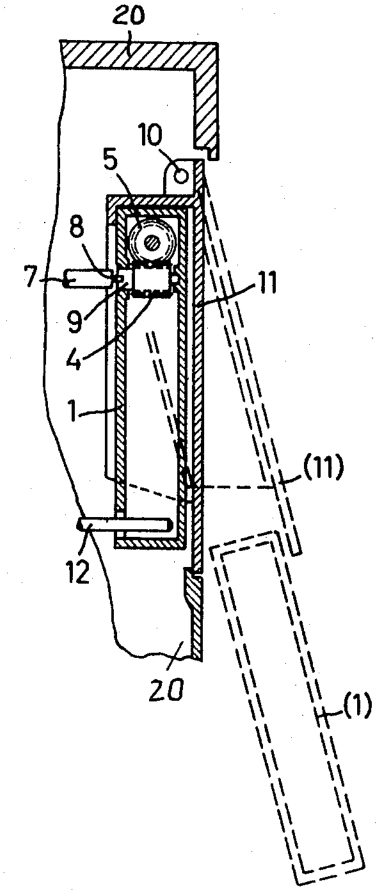
FIG. 2 is a cross sectional view of the embodiment of FIG. 1.

When the cartridge 1 is in the position shown in FIG. 2, the motor of the tape recorder drives drive shaft 7, and through the engaged coupling means 8,9, the pointer-operating transmission 4,5,6.

Cartridge 1 is inserted into a cavity of a holding lid 11 which is mounted for angular movement about pivot means 10 on the tape recorder housing 20 and forms a guide portion of housing 20 for guiding cartridge 1. The holding lid 11 can be manually turned about mounting means 10 to the tilted position shown in broken lines in FIG. 2, together with the cartridge 1, so that coupling means 9 is separated from coupling means 7,8 a small distance in axial direction, while the axes of coupling means 7,8 and 9 remain substantially aligned due to the position of the pivotal mounting means 10 relative to the coupling means, and due to the very small distance which coupling means 8 and 9 are spaced in the tilted preliminary position of the cartridge 1.

For the sake of clarity, the cartridge 1 is not shown in the preliminary tilted position described above, but shown in broken lines in a position removed from the holding lid 11, which is possible due to the fact that in the tilted open position of the holding lid 11, the coupling means are separated and do not block movement of cartridge 1 transverse to the axes of coupling means 7,8 and 9.

A cartridge 1 is inserted into the holding lid 11 when the same is in the position shown in broken lines, until the narrow side wall of the cartridge abuts the corresponding wall bounding the cavity in the holding lid 11. In this preliminary position of cartridge 1, the axis of coupling means 9 is substantially aligned with the axis of coupling means 7,8, but the coupling projection 8 is axially spaced from the coupling recess in coupling means 9.

When holding lid 11 is now closed until abutting the top wall of tape recorder housing 20, the recess in coupling means 9 engages the coupling projection 8, so that worm screw 4 is driven through the coupling means by the drive shaft 7 of the tape recorder, and transmit movement to the worm gear 5 and the screw spindle 6 by which the pointer is driven for indicating the portion of the tape which is being sensed.

Due to the fact that the worm screw 4 is spaced a small distance from the pivotal mounting means 10, coupling means 9 is spaced a very small distance from coupling means 8 when holding lid 11 is opened, but the small distance is sufficient to permit movement of the cartridge 1 out of the holding means in a direction transverse to the axis of the coupling means 9 to the detached position shown in broken lines in FIG. 2.

The cartridge is preferably made, at least partly, of a transparent synthetic material, and the graduated scale 13 is preferably pressed into the top casing wall, or embossed on the same.

It will be understood that each of the elements described above, or two or more together, may also find a useful application in other types of an apparatus in which a shaft of a tape cartridge is driven from a drive shaft of a tape recorder differing from the types described above.

While the invention has been illustrated and described as embodied in a cartridge with a pointer drive which is coupled with a drive shaft of the tape recorder by tilting a pivotally mounted holding lid with the cartridge, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Tape recorder with pointer drive, comprising housing means having a guide portion; a drive shaft mounted in said housing means rotatable about a first axis, and including first coupling means having a non-circular first coupling portion projecting from said housing means in the direction of said first axis; and a tape cartridge including a casing, and a pointer-operating transmission mounted in said casing and including meshing gears and a second coupling means on one of said meshing gears rotatable with the same about a second axis and having a non-circular second coupling portion extending in the direction of said second axis, said casing abutting said guide portion of said housing means in a preliminary position in which said first and second axes register and said first and second coupling portions are spaced in axial direction from each other, said tape cartridge being guided by said guide portion for movement transverse to said first and second registering axes to and from said preliminary position, and also guided for movement from said preliminary position in the direction of said first axis to and from an operative position in which said first and second coupling portions engage each other whereby said drive shaft drives said pointer-operating transmission by said first and second coupling portions.

2. Tape recorder as claimed in claim 1 wherein said pointer-operating transmission includes a screw spindle mounted for turning movement in said casing, a pointer-carrying nut mounted on said screw spindle and guided in said casing for movement along said screw spindle, a worm gear secured to one end of said screw spindle, and a worm screw meshing with said worm gear and being mounted in said casing for rotation about said second axis; and wherein said second coupling portion is secured to said worm screw for rotation with the same about said second axis.

3. Tape recorder as claimed in claim 1 wherein one of said first and second coupling means has an axially projecting coupling portion, and the other coupling means has an axially recessed coupling portion in which said projecting coupling portion is located in said operative position of said tape cartridge.

4. Tape recorder as claimed in claim 1 wherein said first coupling portion is a diametrical coupling projection on the end face of said drive shaft; and wherein said second coupling portion is formed with a recess for receiving said diametrical coupling projection in said operative position of said cartridge.

5. Tape recorder as claimed in claim 1 wherein said casing of said cartridge has a casing wall located in said operative position in a plane perpendicular to said first axis, and being tilted in said preliminary position relative to said plane at an acute angle; and wherein said second axis is perpendicular to said casing wall.

6. Tape recorder as claimed in claim 5 wherein said casing has a bore; wherein said second coupling means includes a cylindrical portion integral with said one gear and being rotatable in said bore, said cylindrical portion having an end face flush with the outer surface of said casing wall and a recessed second coupling portion; and wherein said first coupling portion includes a coupling projection engaging said recessed second coupling portion in said operative position of said tape cartridge.

7. Tape recorder as claimed in claim 5 wherein said housing means includes holding means for said tape cartridge mounted for angular movement with said tape cartridge between a normal position in which said tape cartridge is in said operative position, and an inserting position displaced relative to said plane so that said tape cartridge can be inserted into said displaced holding means and until abutting the same in said preliminary position for movement with the same to said operative position.

8. Tape recorder as claimed in claim 1 wherein said housing means includes a housing having means for mounting said drive shaft and an opening through which said free end of said drive shaft projects, and a holding lid mounted on said housing for angular movement between a closing position closing said opening, and an open position; wherein said tape cartridge is inserted into, and then held by said holding lid in said preliminary position abutting the same, and is movable with the same to said closing position in which said tape cartridge is in said operative position.

9. Tape recorder as claimed in claim 8 wherein said housing means includes means for mounting said holding lid on said housing for angular movement about an axis perpendicular to said second axis; and wherein said holding lid is tiltable an acute angle between said closing and open positions.

10. Tape recorder as claimed in claim 8 wherein said housing means includes means for mounting said holding lid for angular movement about a tilting axis; wherein said holding lid has a cavity into which a portion of said tape cartridge fits so that the same can be inserted into said cavity in said open position and is held abutting the same in said preliminary position; wherein said tape cartridge has a narrow side wall bounding said cartridge portion and located in said cavity; wherein said transmission means and second coupling means are located in said portion of said tape cartridge; wherein said side wall is parallel to said tilting axis and is located adjacent said mounting means and the part of said holding lid mounted on the same; and wherein said second axis is perpendicular to said tilting axis.

* * * * *